United States Patent [19]

Whitehouse

[11] 4,434,858

[45] Mar. 6, 1984

[54] AIR TOOL WITH STALL TORQUE REGULATOR AND AIR BIASING MECHANISM

[75] Inventor: Hugh L. Whitehouse, Lyndhurst, Ohio

[73] Assignee: The Stanley Works, New Britain, Conn.

[21] Appl. No.: 340,266

[22] Filed: Jan. 18, 1982

[51] Int. Cl.[3] ........................ B25B 23/14; B25B 21/00; B23P 19/06

[52] U.S. Cl. ........................................ 173/12; 173/93.5; 91/59

[58] Field of Search ...................... 173/12, 93.5; 91/59; 192/150; 81/470

[56] References Cited

U.S. PATENT DOCUMENTS

| | | | |
|---|---|---|---|
| 3,373,824 | 3/1968 | Whitehouse | 173/12 |
| 3,786,873 | 1/1974 | Whitehouse | 173/12 |

FOREIGN PATENT DOCUMENTS

| | | |
|---|---|---|
| 1142665 | 2/1969 | United Kingdom . |
| 1194653 | 6/1970 | United Kingdom . |
| 1261769 | 1/1972 | United Kingdom . |
| 1378311 | 12/1974 | United Kingdom . |
| 1378312 | 12/1974 | United Kingdom . |
| 1493262 | 11/1977 | United Kingdom . |

*Primary Examiner*—James M. Meister
*Attorney, Agent, or Firm*—Hayes & Reinsmith

[57] ABSTRACT

The air tool of this invention features a shut-off valve in a motor inlet passage with an air bias compartment at one end of the valve and a motor pressure compartment at an opposite end of the valve directly communicating with the inlet to the motor. The air bias compartment has adjustable air bleed means for selectively reducing the pressure in the air bias compartment from a predetermined line pressure to a desired operating pressure at a constant percentage less than the predetermined line pressure. To establish the predetermined line pressure of the air supplied to the motor and to the air bias compartment of the shut-off valve, a stall torque regulator is provided upstream of the shut-off valve. This regulator serves to maximize the flexibility of the tool by providing for the adjustment of the tool to a given range of pressure and torque at which the motor will shut off but without undesirably affecting the free running speed of the motor within that given range.

13 Claims, 5 Drawing Figures

FIG. 2
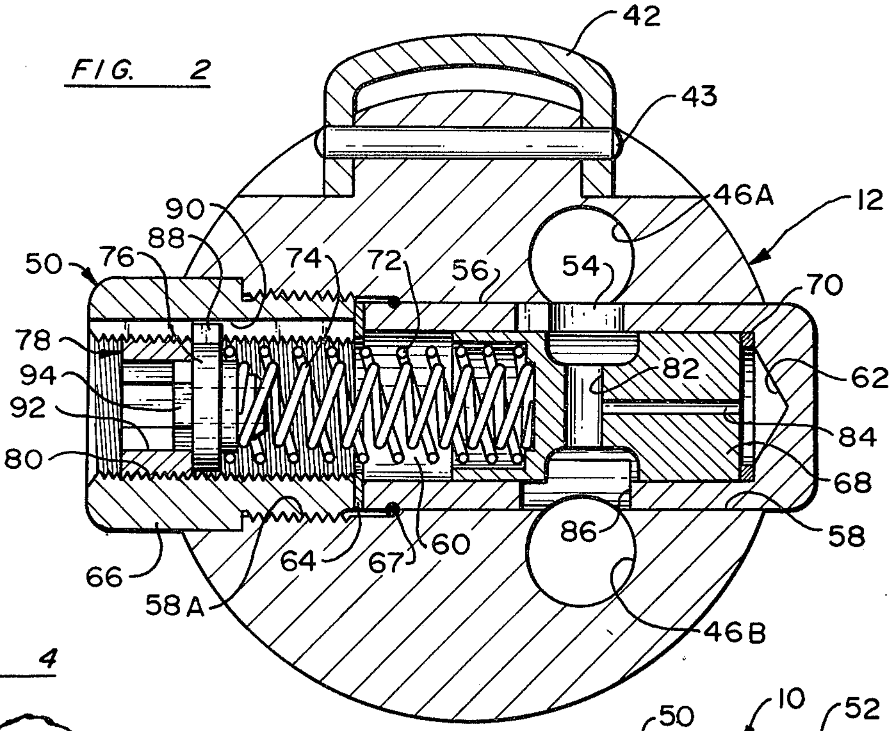
FIG. 4
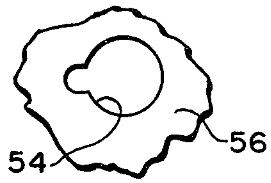
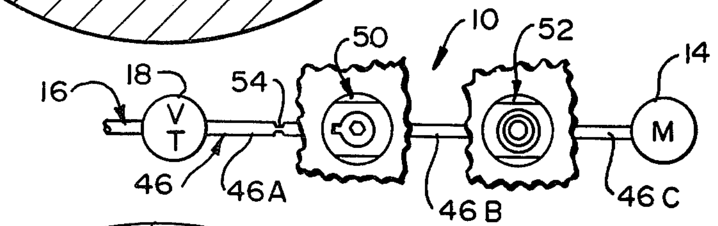
FIG. 5
FIG. 3
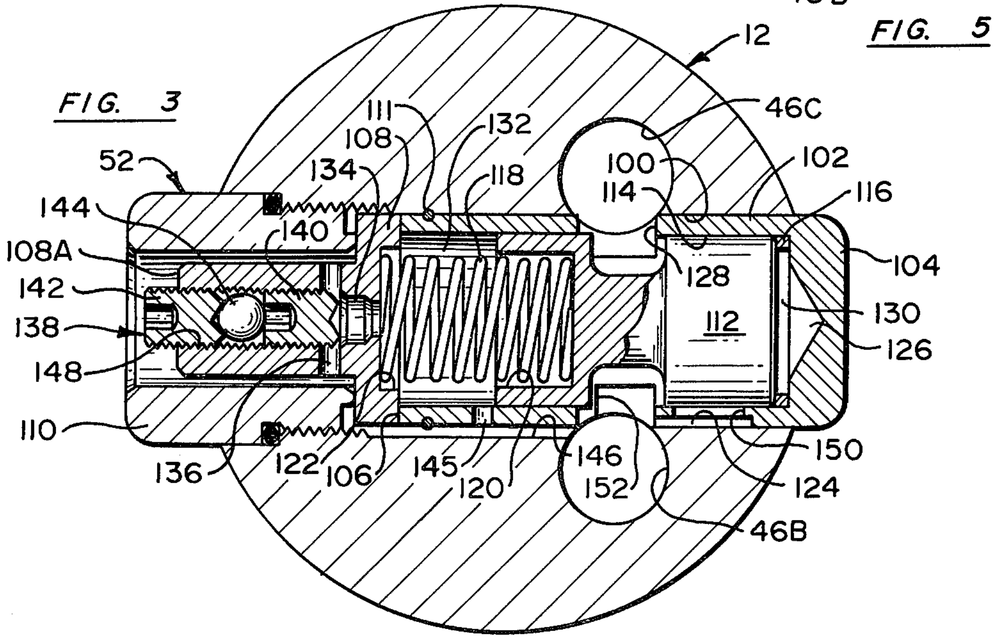

AIR TOOL WITH STALL TORQUE REGULATOR AND AIR BIASING MECHANISM

FIELD OF THE INVENTION

This invention relates to power tools and particularly concerns fluid operated tools such as nut setters, screw drivers and the like. More specifically, this invention deals with air tools of a general type described in U.S. Pat. Nos. 3,373,824 and 3,786,873 issued in the name of Hugh L. Whitehouse and respectively entitled "Fluid Operated Tool" and "Stall Torque Regulator Valve For Fluid Operated Power Tool", both of which patents are assigned to the assignee of this invention.

SUMMARY OF THE INVENTION

To eliminate any need for an external pressure regulator and yet maintain the free running speed of a power operated tool over a large range of its torque adjustment and also absolutely ensure tool shut-off at a predetermined fastener torque with uniform reliability, the power tool of this invention incorporates a stall torque regulator in a motor inlet passage between an upstream throttle valve and a downstream torque control shut-off device which features an air bias to maintain the device in a normally open flow control position.

OBJECTS OF THE INVENTION

A principal object of this invention is to provide a new and improved power tool having an air operated motor, e.g., and featuring a stall torque regulator and torque control shut-off device so located in the tool as to control its maximum operating pressure and motor stall torque while at the same time minimizing speed reduction at reduced stall points of the tool and, in addition, accurately sensing variations in output force of the tool for automatically shutting off the motive fluid when a predetermined fastener torque is developed.

Another object of this invention is to provide a new and improved tool incorporating a stall torque regulator and torque control shut-off device of the type described which may be incorporated in a compact power tool envelope in predetermined locations to maximize tool efficiency and flexibility for a variety of different applications.

A further object of this invention is to provide such a tool having a stall torque regulator of simplified, rugged construction for reliable performance under demanding conditions over a wide torque range with high torque capability and minimum maintenance requirements. Coupled with this object is the aim of providing such a power tool which is capable of responding during its application with minimal time delay in tool shut-off to provide superior uniformity and reliability of operation in precisely setting a workpiece to a desired degree of tightness.

Other objects will be in part obvious and in part pointed out in more detail hereinafter.

A better understanding of the objects, advantages, features, properties and relationships of this invention will be obtained from the following detailed description and accompanying drawings which set forth an illustrative embodiment and are indicative of the way in which the principle of this invention is employed.

BRIEF DESCRIPTION OF THE DRAWINGS

In the drawings:

FIG. 2 is a section view taken generally along line 2—2 of FIG. 1;

FIG. 3 is a section view taken generally along line 3—3 of FIG. 1;

FIG. 4 is a fragmentary view, partly broken away, showing a port formed in a valve sleeve of the tool of FIG. 1; and FIG. 5 is a schematic view showing torque control devices of this invention interposed in a fluid supply line between a fluid operated motor and an on-off control valve.

DETAILED DESCRIPTION OF A PREFERRED EMBODIMENT

Figure 1:
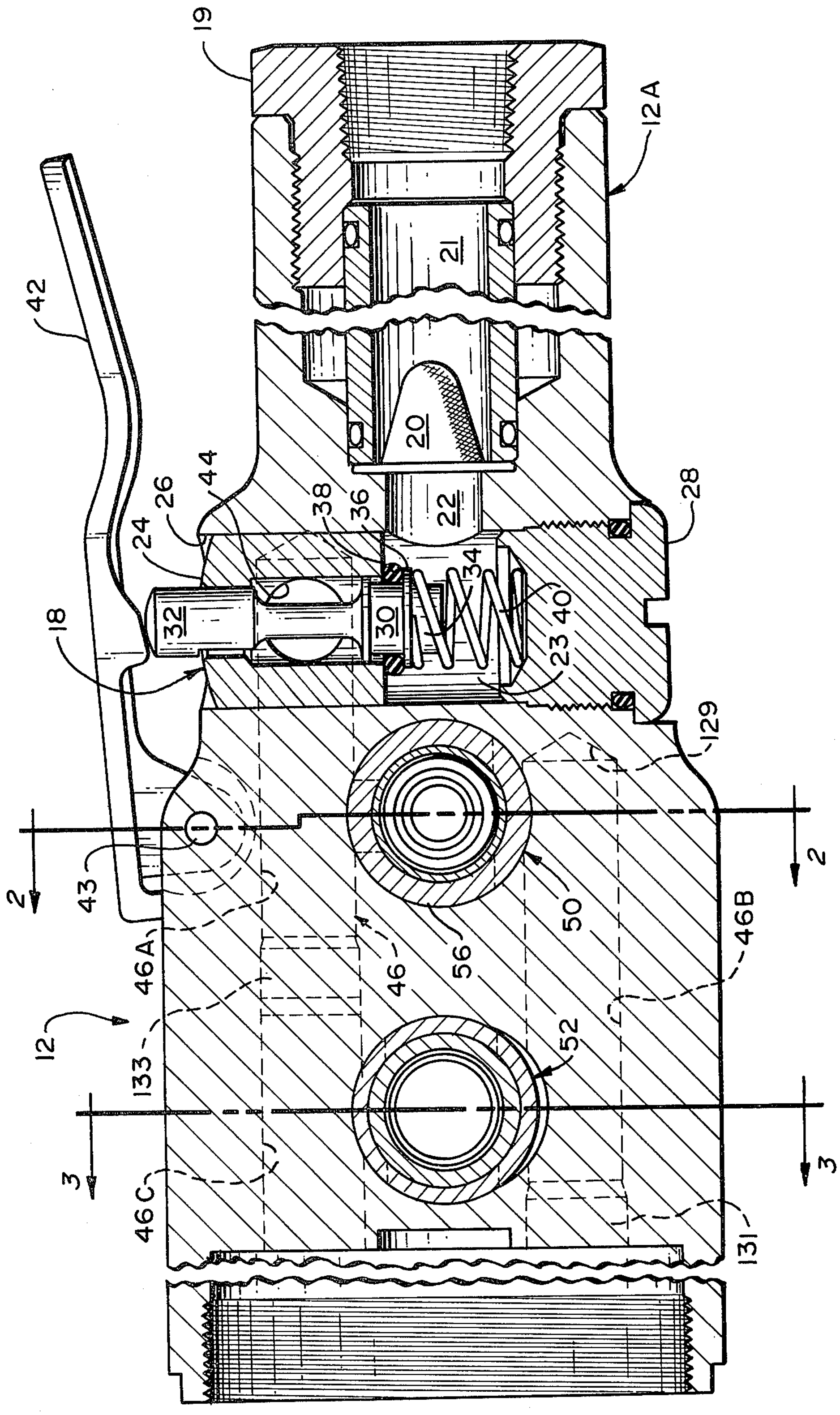
FIG. 1 is a view, partly in section and partly broken away, of a power tool incorporating this invention.

Referring to the drawings in detail, a power tool such as a power screwdriver, nutsetter or similar fluid operated tool is shown partly in section at 10 having a generally cylindrical housing 12 with a fluid motor 14 (FIG. 5). Motor 14 is preferably a conventional rotary vane type air motor.

Motor 14 is mounted in housing 12 for driving a spindle, not shown, which will be understood to be operatively connected to a work engaging element of tool 10. Compressed air from a suitable source, not shown, is fed to supply line 16 formed within housing 12 for driving air motor 14, and air flow is controlled by any suitable on-off control such as throttle valve 18.

Supply line 16 includes a suitable coupling having an inlet bushing 19 (FIG. 1) at the rear of handle portion 12A to provide for the supply of compressed air which flows through inlet screen 20 in a passageway 21. Passageway 21 comprises a series of passages described more specifically below, leading to motor 14. An inlet passage 22 of passageway 21 communicates with a valve chamber 23 defined by bushing 24, fixed in one end of bore 26 extending across housing 12, and by a plug 28 closing the other end of bore 26.

For controlling the air supply, a throttle valve member 30 is received in chamber 23. A stem 32 of member 30 projects through bushing 24. An inner end 34 of throttle valve member 30 has a flange 36. One side of flange 36 has an annular seal 38, for engaging bushing 24. The other side of flange 36 has a compression spring 40 mounted thereon and seated between flange 36 and plug 28 to hold throttle valve member 30 in its illustrated normally closed position (FIG. 1).

To unseat the throttle valve member 30 and actuate motor 14, a hand lever 42, pivotally supported by pin 43 on housing 12 and engaging stem 32, is manually depessed. Air then passes from chamber 23 through outlet port 44 in bushing 24 communicating with a motor inlet passage 46 leading to motor 14.

To eliminate any need for an external pressure regulator and yet maintain free speed of motor 14 over a wide torque adjustment range while also ensuring superior uniformity in precisely tightening a fastener, e.g., to a predetermined degree of tightness, tool 10 of this invention features significantly improved flexibility of applications wherein both a stall torque regulator 50 and an adjustable torque control shut-off device 52 are provided in motor inlet passage 46 between throttle valve 18 and motor 14 in a compact new tool construction incorporating a minimum number of parts for extended and reliable service under demanding conditions.

To regulate torque output of tool 10 for running a fastener within a desired torque range, for example, a restriction 54 (FIGS. 4 and 5) is provided between motor inlet passage portions 46A and 46B of supply line 16. Restriction 54 provides orifice restriction to effect a pressure drop at free running speed of tool 10. Reduction in the torque output of tool 10 is achieved without any further reduction in speed by the provision of built-in stall torque regulator 50 in inlet passage 46 between its portions 46A, 46B leading to motor 14 with regulator 50 located downstream of restriction 54.

If an on-off control, such as throttle valve 18, is part of tool 10, the on-off control itself may provide suitable orifice restriction which must occur upstream of stall regulator 50. Regulator 50 is of a general type described in the above referenced U.S. Pat. No. 3,786,873. In the illustrated embodiment, orifice restriction is provided by a keyhole shaped orifice 54 (FIGS. 2 and 4) which communicates with motor inlet passage portion 46A and is formed in valve sleeve 56.

Valve sleeve 56 is received in bore 58 extending across housing 12 to define a valve chamber 60 having a closed end provided by wall 62. An opposite open end of sleeve 56 is in abutting engagement with washer 64 secured between sleeve 56 and a coaxially aligned hollow plug 66 screwed into threaded portion 58A of bore 58. Sleeve 56 will be understood to be fixed in bore 58 by lock ring 67.

A stall torque regulator valve 68 is received in chamber 60 for reciprocating movement toward and away from its illustrated normally open flow control position (FIG. 2) established by stop ring 70 seated against sleeve wall 62. Valve 68 is urged toward its normally open position by a pair of concentric compression springs 72, 74 extending axially of chamber 60 and seated between valve 68 and detent plate 76 of lock mechanism 78 operatively mounted in an internally threaded opening 80 of plug 66.

The speed characteristics of tool 10 vary inversely with its load characteristics, and the stall torque regulator 50 is designed to vary the volume of air flow through inlet passage portions 46A, 46B to motor 14, and thus the motor operating pressure, in proportion to a load on motor 14. In the specifically illustrated embodiment, regulator 50 is shown having a passage 82 extending diametrically through a reduced intermediate portion of valve 68. An axially extending passage 84 connects passage 82 to an opening adjacent wall 62 of sleeve 56.

For urging valve 68 to move away from its illustrated open position in opposition to the force of springs 72, 74, air at motor operating pressure is directed from motor 14 and its inlet passage portion 46B through passages 82, 84 to the end of valve 68 (FIG. 2). As back pressure from motor 14 increases, responsive to an increasing torque load on tool 10, valve 68 shifts away from its open position across the restricted inlet port of orifice 54 in opposition to springs 72, 74 to gradually close off inlet passage portions 46A, 46B to motor 14 in supply line 16. Springs 72, 74 serve to continually balance the motor pressure, and orifice 54 effects a continuous linear reduction in flow in supply line 16 under increased torque loading in response to linear valve displacement to cause motor 14 to stall before valve 68 completely closes off orifice 54 to shut-off supply line 16. Orifice 54 is preferably designed to maintain valve travel rate proportional to tool loading rate and is shown for this purpose as having a keyhole configuration (FIG. 4). By such construction, orifice 54 provides a graduated flow orifice restriction which is of reduced size and flow capacity relative to motor inlet passage portions 46A, 46B and outlet port 86 of valve chamber 60.

Running free, the motor operating pressure is lower than full line supply pressure, but increases as motor 14 is loaded. Conventional design of power tools of this type is such that the orifice capacity at the inlet to the motor is sufficiently large to allow for stall leakage with an insignificant drop in motor operating pressure. By providing for maximum orifice flow capacity, increase in the motor operating pressure is minimized from free running, through load, to or near stall. At stall, motor stall leakage maintains the motor pressure lower than full line supply pressure. Motor pressure at stall, and hence the stall torque, is determined by the amount of air which gets into the motor 14 less the amount which leaks out.

In an air tool of quality design and manufacture with a motor intake sufficiently large to supply enough air, motor pressure at stall is usually close (within a pound or two) to line pressure. However, in the same motor with a stall torque regulator 50 controlling the size of the motor intake, the motor running pressure, say, with 90 psi full line supply pressure, may be as low as 60–65 psi. In the illustrated embodiment, the restricted orifice 54 within supply line 16 provides a controlled amount of flow restriction to drop the free running pressure at least to this pressure, or if desired, to a lower pressure. With a built-in restriction causing a free running pressure of, say, 60 psi, stall torque regulator 50 may then be set for 60 psi, e.g., and by virtue of the above described construction will have no effect on the free running speed while yet effecting a reduction in the stall torque by about 33 percent in the example given.

In another tool with 90 psi supply pressure at the inlet and with the stall torque regulator 50 set at maximum adjustment, the tool runs at 320 rpm and stalls at 125 foot-pounds. While its regulator 50 is moved to minimum adjustment, the tool continues to run at 320 rpm but upon reaching minimum adjustment at about 75 foot-pounds, the motor speed begins to decrease, just as though an external pressure regulator were being used. However, in the torque adjustment range of 75 to 125 foot-pounds, that tool will run at one speed at 320 rpm without any necessity for an external pressure regulator. By maintaining speed while torque is adjusted, minimum running time on the job is assured. Moreover, should line pressure be above 90 psi, damage to gear train parts is prevented by the stall torque regulator 50.

For quick and easy adjustment of the stall pressure and accordingly the stall torque to meet the characteristics of different applications of tool 10, the biasing force of springs 72, 74 may be adjusted to a desired compression setting by the above mentioned lock mechanism 78. Detent plate 76 has a radial tang 88 received in an axially extending slot 90 within plug 66 for movement to a selected position axially of plug 66 responsive to a corresponding adjustment of a hollow hex adjusting screw 92. Screw 92 threadably engages the bore of plug 66 and may be adjusted by a suitable hex wrench, not shown. The wrench is simply inserted through screw 92 to disengage hex projection 94 on plate 76 from a corresponding hex opening in screw 92 which is then free to be rotated and axially adjusted within plug 66. Upon partially withdrawing the wrench into non-interfering relation to plate 76 and continuing to rotate screw 92, hex projection 94 snaps back under spring pressure into locking engagement within hex opening of screw 92 with tang 88 of plate 76 located within slot 90 of plug 66. Such action secures springs 72, 74 in an adjusted setting for establishing the stall point of tool 10 for a particular application.

Springs 72, 74 accordingly are selectively set by adjustment of lock mechanism 78 to control stall pressure and stall torque of the motor 14 without affecting the specified free running speed of the motor by virtue of the location of the stall torque regulator 50 downstream of restricted orifice 54.

Referring now to the preferred embodiment of the adjustable shut-off or torque control shut-off device 52, a bore 100 is formed in housing 12 for receiving a sleeve 102 having a closed end 104 and an opposite open end 106 abutting a valve body 108 secured in position within bore 100 by a coaxially aligned hollow packing nut 110 screwed into a threaded end of bore 100. Sleeve 102 is rigidly fixed in position by any suitable means such as the illustrated lock ring 111.

A spool valve 112 is received in chamber 114, defined by inner surfaces of sleeve 102, for reciprocating movement between open and closed positions respectively at opposite ends of chamber 114. Stop ring 116, at the end of sleeve 102, and a confronting end of valve body 108 respectively provide seats for valve 112 in its open and closed positions. Valve 112 is shown (FIG. 3) in its normally open position where it is maintained by a reset spring 118 when the tool 10 is deactivated. Reset spring 118 has opposite ends bearing against cupshaped cavities 120, 122 in valve 112 and valve body 108.

For automatically shutting off air flow to motor 14 when a predetermined level of torque is reached to precisely control fastener tightness, valve 112 is designed to be responsive to variations in motor operating pressure (which is a function of the output force of motor 14) as generally described in the above referenced U.S. Pat. No. 3,373,824.

As seen in FIG. 3, passages in communication with motor inlet passage portion 46C are provided for continually directing compressed air against valve 112 to provide a force in opposition to the spring force when valve 112 is in its illustrated open position.

More specifically, the clearance between valve 112 and sleeve 102 provides an internal passage whereby compartment 126 between closed end 104 of sleeve 102 and the valve 112 assumes the pressure of the motor 14 via passage portion 46C. Thus, valve 112 presents a pressure sensing surface 130 communicating with passage portion 46C when valve 112 is in its open position.

To minimize the tool envelope size and yet ensure the above described built-in features, the motor passage portions of supply line 16 are provided by two axially formed bores in housing 12. More specifically, a first bore is shown interconnecting diametrically extending bores 58 and 100, respectively, of control devices 50 and 52 to define the intermediate passage portion 46B. Its opposite ends are terminated by an internal wall 129 (FIG. 1) and a housing plug 131. The other bore extends parallel to the first bore but on a diametrically opposed side of bores 58 and 100 with the opposite ends of the second bore communicating with outlet port 44 of bushing 24 and with the inside of the motor housing. By virtue of the described construction, a plug 133 is mounted intermediate the ends of the second bore to define the upstream and downstream passage portions 46A and 46C.

The described construction uniquely provides not only a compact overall tool envelope, but also ensures optimum full open porting to the bias chamber 132 to maximize the air capacity of tool 10 whereby it is capable of providing only a relatively small increase in motor operating pressure from free running, through load, to or near stall.

As previously described, in power tools of the type disclosed, there may be only a relatively small increase in the motor operating pressure from free running, through load, to or near stall. But near or at stall, the air supply pressure at the inlet to motor 14 is slightly higher than pressure in the motor 14. To ensure that pressure in motor 14 as sensed in compartment 126 will overcome the inlet pressure within the passage 16 leading to motor 14 as it approaches stall and thereby move valve 112 to closed position and shut off motor 14, the pressure in an air bias compartment or chamber 132 is kept a constant percentage less than the inlet pressure.

In accordance with this invention, and assuming that compressed air of relatively constant pressure is utilized to produce an air flow to motor 14 under variable torque conditions, a predetermined volume of air is bled from bias chamber 132 through outlet opening 134 (in valve body 108) and a connected cross passage 136 (in stem 108A) past pressure adjusting valve 138 to atmosphere, thereby to establish the pressure in bias chamber 132 at the desired constant percentage less than the inlet pressure.

Valve 138 comprises a pair of socket set screws 140, 142 and a low friction member or ball 144 interposed between screws 140, 142. Set screw 140 serves as an adjustment member and may be selectively adjusted to a desired position relative to outlet opening 134 of valve body 108 to bleed a predetermined amount of air from bias chamber 132 through the restricted opening thereby defined by valve body 108 and screw 140. Such opening will be understood to provide an effective outlet size which is smaller than the size of the inlet port 145 (in sleeve 102), which connects with motor inlet passage portion 46B through clearance 146 between housing 12 and sleeve 102.

By virtue of the disclosed construction, the adjusted position of screw 140, which will be understood to be "factory set", may be secured against undesired movement even under demanding vibrational loading, upon applying a tightening force to socket set screw 142 which serves as a locking member. Such action results in the transmission of the tightening force applied by screw 142, generally parallel to the axes of the screws 140 and 142 via ball 144, to fix screw 140 in adjusted position with significant frictional forces between its threads and those of the surrounding threaded stem opening 148 receiving the screws 140, 142.

Running with no load and with the throttle valve lever 42 depressed and stall torque regulator valve 68 in wide open position, such as on the free rundown of a fastener, air flow through motor 14 is relatively high and pressure at shut-off valve 52 is lower than at throttle valve 18; compartment 126 is charged at motor pressure for it has no outlet and air leaks by the clearance between valve 112 and sleeve 102. Some air, as described above, is bled to atmosphere from bias chamber 132 although at free running the motor pressure in compartment 126 is lower than the pressure in bias chamber 132 whereby valve 112 remains in wide open position as illustrated in FIG. 3.

As the fastener tightens, motor air pressure increases as the air demand decreases; the stall regulator valve 68 seeks a place midway between open and shut to leave enough intake open to maintain a motor pressure to balance the force set on the springs 72, 74; and the pressure in compartment 126 of shut-off device 52 increases such that, just before stall, it is greater than the pressure in bias chamber 132 and shut-off valve 112 starts to move toward valve body 108. Such movement of valve 112 causes its pressure sensing surface 130 to be exposed to inlet air pressure via port 150, notch 124 and motor inlet passage portion 46B as valve 112 chokes off air flow to motor 14. As valve 112 moves toward valve body 108, valve 112 opens port 150 and closes port 152 to chamber 114, closing flow to motor 14, whereby the pressure rise in compartment 126 drives valve 112 into shut-off position completely closing inlet port 152.

Valve 112 remains in shut-off position until throttle lever 42 is released. Air in compartment 126, bias chamber 132 and upstream passages leading to throttle valve 18 then exhausts through bleed passages 134, 136 of shut-off device 52, whereupon reset spring 118 returns valve 112 to open position and springs 72, 74 return regulator valve 68 to its wide open position. Since motor operating pressure is a function of the load on motor 14, the above described construction provides an automatic pressure actuated shut-off valve sensitive to motor load over a range of motor operating pressures. The described construction uniquely provides an effective air tool shut-off wherein the built-in stall torque regulator 50 upstream of the shut-off device 52 may be utilized to establish the shut-off motor pressure and the bias chamber pressure at desired values which vary in accordance with the settings of the stall torque regulator 50.

To preset the shut-off torque at a desired lower value, e.g., an adjustment is effected by adjusting the stall torque regulator 50 as described above. The shut-off pressure will always be slightly below the motor stall pressure to ensure that the advantages of safety and precision fastener torque settings of the shut-off feature are achieved. Down to about 35 psi, pressure in compartment 126 of shut-off device 52 will overcome pressure in bias chamber 132 as tool 10 approaches stall, and tool 10 will shut off. As inlet pressure is reduced, the pressure difference in chambers 126 and 132 is minimized until below about 35 psi the biasing force of reset spring 118 equals the difference and tool 10 stalls. Another tool size is called for at such low torque.

As will be apparent to persons skilled in the art, various modifications and adaptations of the structure above described will become readily apparent without departure from the spirit and scope of the invention, the scope of which is defined in the appended claims.

I claim:

1. An air tool comprising a housing having an air supply line including a motor inlet passage and a valve chamber formed in the motor inlet passage, an air operated rotary motor in the housing having a normal free running no-load speed at a predetermined line pressure which decreases in speed as torque loading on the motor increases, a shut-off valve movable in the valve chamber between a normally open position and a closed position for shutting off air to the motor, a compartment being formed in the chamber at one end of the valve and directly communicating with an inlet to the motor for directing air under motor operating pressure against the valve for moving it toward said closed position, an air bias compartment being formed in th chamber at the opposite end of the shut-off valve and communicating with the air supply line upstream of the shut-off valve chamber, the air bias compartment being connected to an air bleed passage to atmosphere, and adjustable valve means in the air bleed passage for selectively reducing the pressure in the air bias compartment, relative to a predetermined line pressure of the air supplied, for selective shut-off of air flow to the motor at a predetermined level of motor output as determined by the air pressure acting on the motor, and stall torqure regulator means in the air supply line upstream of the shut-off valve chamber, the stall torque regulator means being operable in response to fluid pressure acting on the motor for establishing said predetermined line pressure of the air supplied to the motor and to the air bias compartment of the shut-off valve chamber.

2. The tool of claim 1 further including a throttle valve mounted in the housing for establishing open and closed air flow conditions in the supply line, the motor inlet passage of the supply line extending downstream of the throttle valve, and the stall torque regulator means being mounted in the motor inlet passage downstream of the throttle valve.

3. The tool of claim 1 further including a valve body having said air bleed passage formed therein, an adjustment member threadably received in the valve body and movable in the bleed passage for varying its flow capacity, a locking member threadably received in the valve body, and a low friction member between the adjustment and locking members for directly transmitting a locking force from the locking member to the adjustment member upon its being located in a desired position in the bleed passage.

4. A fluid operated tool comprising a housing having a fluid motor, the motor having a normal free running no-load speed at a predetermined line pressure which decreases in speed as torque loading on the motor increases, a supply line in the housing for directing fluid under pressure to the motor, a throttle valve for establishing open and closed fluid flow conditions in the supply line, the supply line including a motor inlet passage downstream of the throttle valve and connected to the motor, a stall torque regulator including a valve in the supply line operable in response to fluid pressure acting on the motor and movable toward and away from a normally open flow control position for controlling the pressure and torque at which the motor will stall, and a pressure sensing shut-off device including a bistable on-off shut-off valve in the supply line movable between a normally open position and a closed position for shutting off fluid flow to the motor, the stall torque regulator valve and shut-off valve being movable in separate chambers formed in the housing in the motor inlet passage, the stall torque regulator valve and shut-off valve each being operable in response to fluid pressure acting on the motor.

5. The tool of claim 4 wherein the shut-off valve chamber includes an air bias compartment and a motor pressure compartment at opposite ends of the shut-off valve, the motor pressure compartment communicating with the downstream motor inlet for maintaining the compartment at motor operating pressure, the air bias compartment communicating with the upstream motor inlet passage connected to the stall torque regulator, and the air bias compartment having air bleed means for reducing the pressure in the air bias compartment to a constant percentage less than the pressure in the upstream motor inlet passage.

6. The tool of claim 5 wherein the stall torque regulator valve has adjustable means for selectively presetting the pressure and torque at which the motor will stall, said adjustable means additionally being operable for establishing the line pressure in the passage to the air bias compartment of the shut-off valve chamber.

7. The tool of claim 6 wherein the air bleed means has adjustment means for adjustably reducing the pressure in the air bias compartment to a selected constant percentage less than the pressure in the upstream motor inlet passage.

8. The tool of claim 7 wherein the adjustment means for the air bleed means includes a valve body having a bleed passage connecting the air bias compartment to atmosphere, an adjustment member threadably received in the valve body and movable in the bleed passage for varying its flow capacity, a locking member threadably received in the valve body, and a low friction member between the adjustment and locking members for directly transmitting a locking force from the locking member to the adjustment member upon its being located in a desired position in the bleed passage.

9. The tool of claim 4 wherein the housing is a generally cylindrical member, wherein the chambers of the stall torque regulator valve and the shut-off valve are generally cylindrical and extend in parallel relation diametrically of the housing, and wherein first and second bores extend in parallel relation to the major longitudinal axis of the housing and in communication with opposite diametrical sides of the valve chambers, the first bore having opposite closed ends and defining therebetween an intermediate portion of the motor inlet passage interconnecting the valve chambers, the second bore extending between a motor compartment of the housing and the throttle valve, the second bore having a plug therein intermediate its ends and defining upstream and downstream portions of the motor inlet passage interconnecting, respectively, the chambers of the throttle and torque regulator valves and the shut-off valve chamber and the motor compartment.

10. The tool of claim 4 wherein the shut-off valve chamber is located in the motor inlet passage between the stall torque regulator valve chamber and the motor.

11. The tool of claim 4 wherein flow restriction means is provided in the housing upstream of the stall torque regulator, wherein the stall torque regulator includes adjustable biasing means for urging the stall torque regulator valve toward said open flow control position, and wherein one end of the stall torque regulator valve chamber is in communication with the motor inlet passage for directing fluid under motor operating pressure against the stall torque regulator valve in opposition to the biasing means.

12. The tool of claim 11 wherein the flow restriction means is configured and dimensioned to gradually and increasingly reduce the fluid flow through the stall torque regulator valve chamber responsive to regulator valve travel under increased tool loading for maintaining the valve travel rate of displacement from its open flow control position proportional to the rate of increase in the torque load on the motor.

13. The tool of claim 12 wherein the biasing means and the flow restriction means coact for controlling the pressure and torque at which the motor will shut off without affecting said free running speed of the motor.

* * * * *